US006525292B1

(12) United States Patent
Girold

(10) Patent No.: US 6,525,292 B1
(45) Date of Patent: Feb. 25, 2003

(54) CARTRIDGE FOR A PLASMA TORCH AND PLASMA TORCH FITTED THEREWITH

(75) Inventor: Christophe Girold, Piolenc (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/958,029

(22) PCT Filed: Apr. 11, 2000

(86) PCT No.: PCT/FR00/00919

§ 371 (c)(1), (2), (4) Date: Oct. 2, 2001

(87) PCT Pub. No.: WO00/64224

PCT Pub. Date: Oct. 26, 2000

(30) Foreign Application Priority Data

Apr. 14, 1999 (FR) .......................................... 99 04647

(51) Int. Cl.[7] .............................................. B23K 10/00

(52) U.S. Cl. .......................... 219/121.49; 219/121.52; 219/121.48; 219/75; 313/231.31

(58) Field of Search ...................... 219/212.48, 121.49, 219/121.5, 121.52, 121.59, 74, 75; 313/231.31, 231.41

(56) References Cited

U.S. PATENT DOCUMENTS 4,682,005 A * 7/1987 Marhic ................ 219/121 PM
4,973,816 A * 11/1990 Haberman ............. 219/121.48
5,278,387 A * 1/1994 Borne ................... 219/121.39
5,444,208 A * 8/1995 Mortensen ............. 219/121.48

FOREIGN PATENT DOCUMENTS

| | | |
|---|---|---|
| EP | 0002623 | 6/1979 |
| JP | 04249096 | 9/1992 |
| WO | WO 9104122 | 4/1991 |
| WO | WO 9208335 | 5/1992 |

* cited by examiner

*Primary Examiner*—Mark Paschall
(74) *Attorney, Agent, or Firm*—Thelen Reid & Priest LLP; Robert E. Krebs

(57) ABSTRACT

A plasma torch includes an interchangeable cartridge (100) consisting of just six parts:

an anode nozzle made of electrolytic copper 1 a cathode support made of el S32-0684-AMctrolytic copper 2 a doped tungsten cathode 3 a cathode centring diffuser device made of plastic material 4 an assembler made of plastic material 5 a ceramic insert 6.

These parts are assembled by means of a press and the assembly of these parts constitutes volumes 71, 72, 73 constituting the cooling circuit of the anode 1 and other components of the torch, and plasmagene gas inflow conduits and connectors.

Fluid inflows and outflows are ensured through a connecting and holding structure provided for easy cartridge (100) assembly.

28 Claims, 8 Drawing Sheets

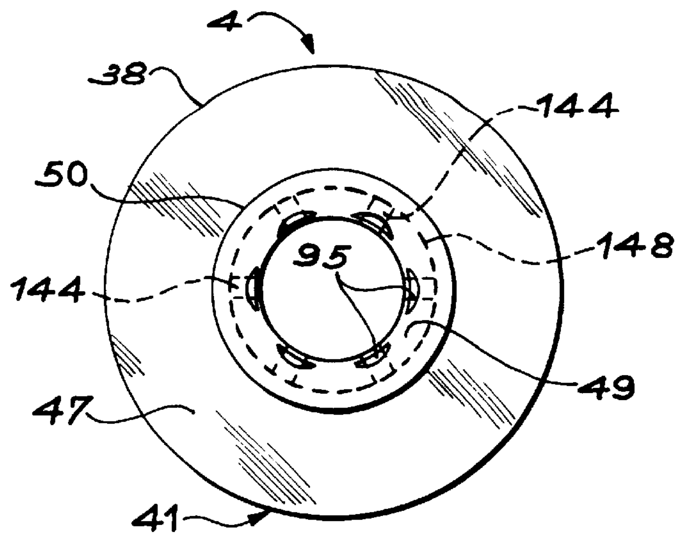
FIG. 7
FIG. 10
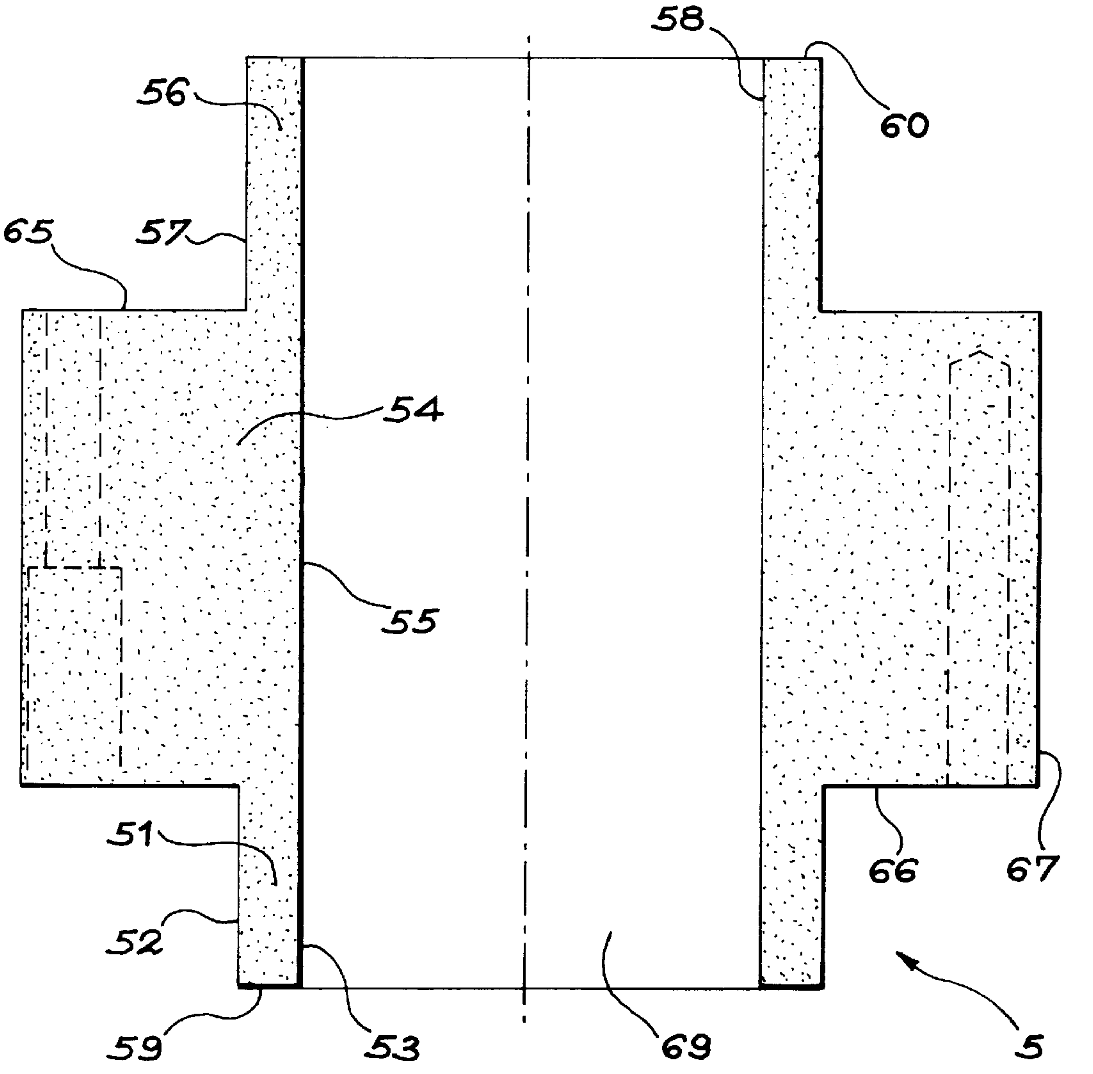

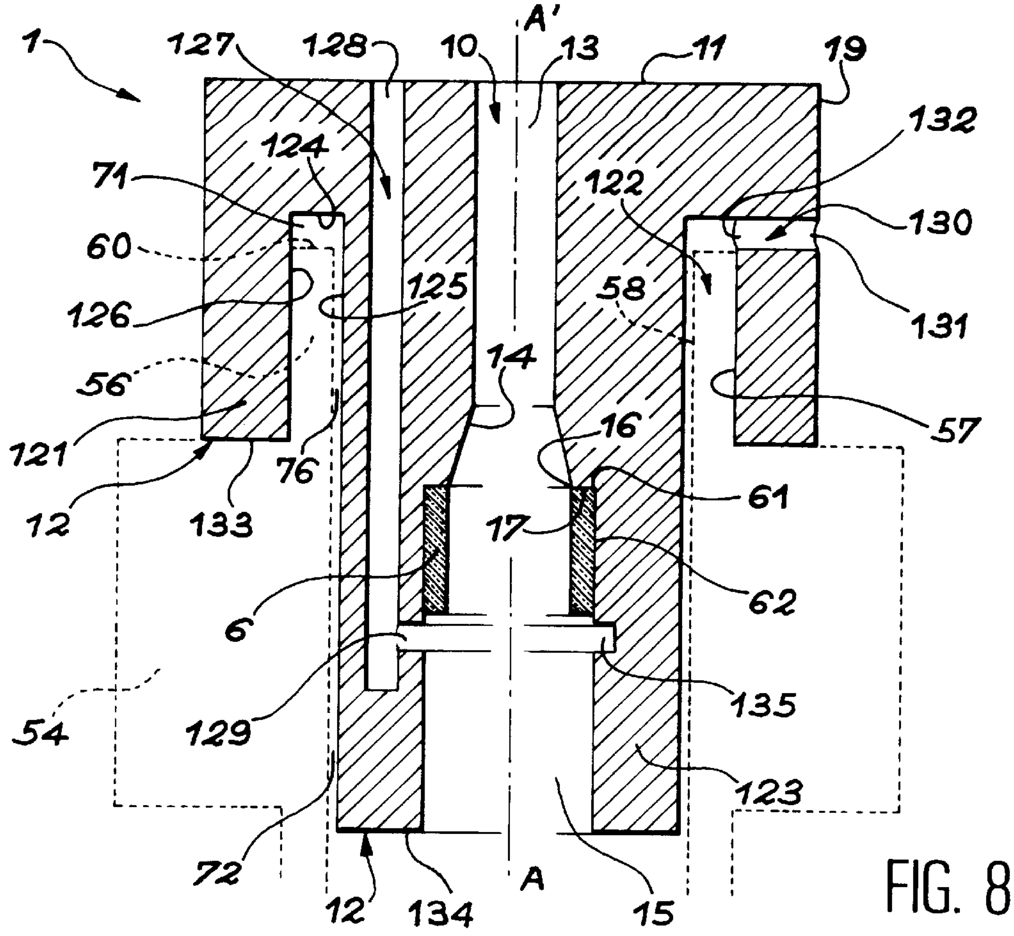
FIG. 8
FIG. 9
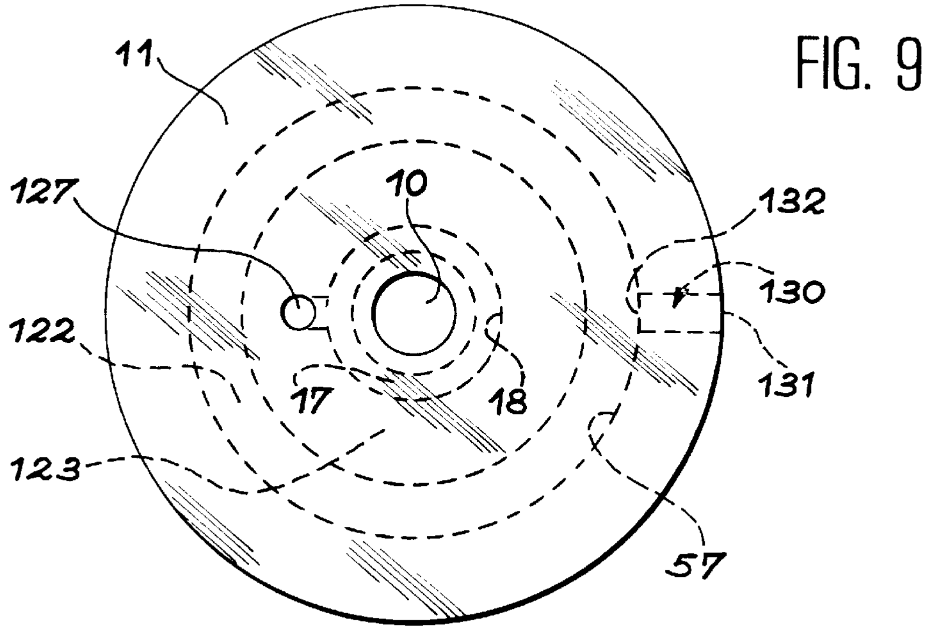

CARTRIDGE FOR A PLASMA TORCH AND PLASMA TORCH FITTED THEREWITH

"This application is a national phase of PCT/FR00/00919, and International Application No. 99/04647, which was filed on Apr. 14, 1999, and was not published in English."

FIELD OF THE INVENTION

The invention is located in the field of plasma torches.

PRIOR ART

Arc plasmas belong to the family of thermic plasmas. They are partially ionised gaseous media, conductive of electricity but by and large electrically neutral, at pressures in the region of atmospheric pressure. They are generated by means of a plasma torch, by passing one or more plasmagene gases through an electric arc which is maintained between two electrodes.

To bring gases to a high temperature and high specific enthalpy, blown arc torches are used. This means that the arc is confined to the inside of the torch containing the two electrodes and it is the high speed jet of high temperature gas (the plasma) which is used in the process.

FIG. 1 shows in a very diagrammatic way the principle of such a torch. A torch of this kind includes two electrodes, an anode 1 and a cathode 3, concentric with each other and providing between them a gas circulation channel 7.

The two electrodes 1,3 are connected to a high voltage, high frequency (HV-HF) generator and to a direct current generator. They must of necessity be energy cooled (by water circulation) to prevent their fusion.

Initially and by means of the HV-HF generator, an electric arc 8 flashes between the two electrodes (cathode and anode) ionising the gas introduced and making the inter electrode space conductive. The direct current generator may then issue into this space and maintain the arc.

The power supplied to the torch is equal to the product of the strength (which can be regulated) of the voltage established between the anode and the cathode. This voltage is dependent on several parameters such as the type and flow of gas used, but also, to a not insignificant degree, on the wear and tear on the electrodes. The power of the plasma 9 is equal to the power supplied to the torch minus the losses in the cooling water. Wear and tear on the electrodes puts them therefore at a serious disadvantage. It depends on their geometry, their cooling efficiency, their coaxiality, and on the type and purity of the gases.

Equipment allowing an arc 8 plasma 9 to be generated is used for thermal spraying (surface treatment), gas heating or chemical synthesis. The energy supplied to the gas(es) by the electric arc allows them to be heated to temperatures above 10,000 K.

The choice of plasmagene gas or gases is almost unlimited. It is a function of the demands of the process (oxidation, nitridation, high temperature in a reduction medium, etc.). The power range is very extensive, running from a few kilowatts to several megawatts. Very often, the potential operational range is dictated by the type and flow of the plasmagene gases selected.

A torch is therefore often designed for a given application since its technology must be compatible with the choice of plasmagene gas and the desired work power.

Its size, its form and its simplicity can also become important if it is required to work in a cramped or hostile environment.

Torches currently in existence are complex units, including at least about ten parts (excluding seals, screws and fluid connectors). The coaxiality of the electrodes depends on the stack of manufactured parts with acceptable tolerances for the seals.

Replacing one or both electrodes is an operation which has to be performed regularly (in most cases after some ten hours in operation). This operation always requires sub-units to be dismantled/re-assembled and the seals to be changed.

To illustrate this, three examples of known plasma torches will now be briefly described.

A first known torch operates with an air/argon or oxygen/argon mix, its power is about 100 kW. It consists of 15 manufactured parts, 21 seals, 22 screws and 6 fluid connectors. The parts subject to regular wear are the cathode and the anode, an insulation bush and an injection nozzle. Minimum maintenance (changing the anode) is required at less than 100 hours of operation in the best conditions of use.

A second known torch has been developed for the hydropyrolysis of heavy hydrocarbons. The plasmagene gases are argon and hydrogen, which are mixed with methane at the torch output. This torch is similar to a thermal spray gun. It has, excluding the fluid feed connectors and the screws, 10 manufactured parts and 7 O-rings.

As a third example may be cited one of the simplest torches, marketed by the company SULZER METCO. This is the thermal spray gun F4-MB. This type of torch operates conventionally with argon, helium and nitrogen singly or in a mixture. Hydrogen is often added to gain power (increase in peak arc voltage). There are nevertheless 8 manufactured parts, 14 O-rings, 12 screw components and 3 fluid connectors.

Japanese patent application JP 04-249 096 describes a plasma torch wherein, in order to reduce the probability of creating an arc between the anode and the cathode, the plasmagene gases follow a path which allows them to eddy. To this end, a centring device 10*a*, which is a part placed between the anode and the cathode, has an opening 106, which goes from the top face of the centring device to a lateral face. Another conduit 102 located between the anode and the centring device part 10 allows the gases coming from the conduit 106 to be guided to the bottom of the anode.

Conduits 107 join the outside of the centring device 10 to a central cavity 105 of the latter. This particularity allows an eddying jet of plasmagene gas to be created. A more even wear of the cathode is thus obtained.

Document EP-0 002 623 A describes a torch wherein the cathode 13 is mounted on a support 23, mobile through rotation of a nut 26 in an axial direction. It is thus possible to adjust finely the value of the stoke hole between the cathode 13 and the anode 14.

The invention described in this document relates essentially to means for imparting to the electric arc between anode and cathode an even rotation so as to prevent rapid wear of the electrode by the arc locking for too long at given points. In the example shown in FIG. 1 or 11, it is a magnet 19 (FIGS. 1–11) generating a magnetic field B (FIG. 4) parallel to the axial direction of the torch.

According to one configuration (FIG. 8), it is a tangential inflow of gas 32' into a flow regulation chamber 15.

According to one shown configuration (FIG. 11), the means is constituted of a helical flap 40 placed on the gas path between the chamber 15 and the nozzle 38.

Cooling is provided by water circulating in conduits 20–21 (FIGS. 1, 8, 11).

BRIEF DESCRIPTION OF THE DRAWINGS

The purpose of the torch, according to the invention, is as far as possible to simplify the assembly of the torch itself and, on the other hand, the replacement from time to time of worn out parts. It has been developed in particular for a gas heating application in a gas postcombustion reactor for pyrolysis of chlorinated radioactive waste, heavily contaminated by alpha emitters. This reactor is intended to operate in a glove box.

In a hostile environment (radioactive, being compelled to work in a glove box or in the remote manipulator), the work must be simplified as far as possible. The standard exchange of sub-units is often preferable to the dismantling and to the re-assembly of isolated parts in a complex unit. The intervention time is shorter, the reliability of a new and inspected sub-unit is much better than that of a dismantled and re-assembled complex unit.

To this end, the plasma torch according to the invention is designed in two parts, a disposable interchangeable cartridge constituting a plasma generator intended to be inserted into a cartridge connecting and holding structure. The purpose of this cartridge connecting and holding structure is to connect the cartridge to its supplies of plasmagene gas, cooling fluid and electrical currents. This structure comprises to this end first cartridge connection means.

These first means serve as intermediaries for the supplies of electrical currents, water and gas. These supplies are therefore completely dissociated from the plasma cartridge.

The structure comprises second means engaging or not engaging with cartridge fixing means so as to keep the cartridge mechanically connected to the first means of supplying electrical currents, water and gas.

The invention relates to a cartridge generating plasma for a plasma torch, having the characteristics featured in claim 1.

In this way the mechanical assembly is made with a single auxiliary assembly part, the assembler, by simple operations carried out under pressure to push the projecting parts along an axial direction into the hollow parts. It will be seen later that with adapted tools a single pressure operation is necessary.

In the preferred embodiment, the projecting parts comprise a first and/or a second annular ring, which fixes itself in a first and/or second annular groove. As a result of this shape, which offers a symmetry of revolution, assembly is simplified, since the parts to be assembled have only to be coaxially positioned with the assembler, the anode and/or the cathode support, for fixing to be completed, without it being necessary to index them angularly.

BRIEF DESCRIPTION OF THE DRAWINGS

Figure 1:
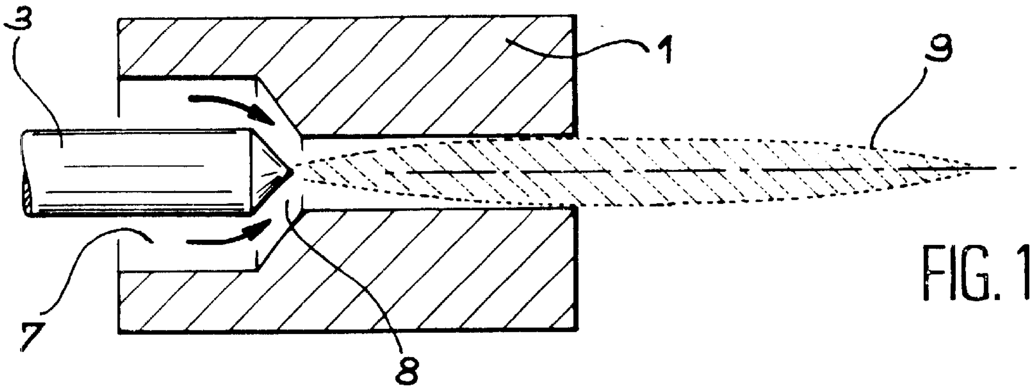
Figure 2:
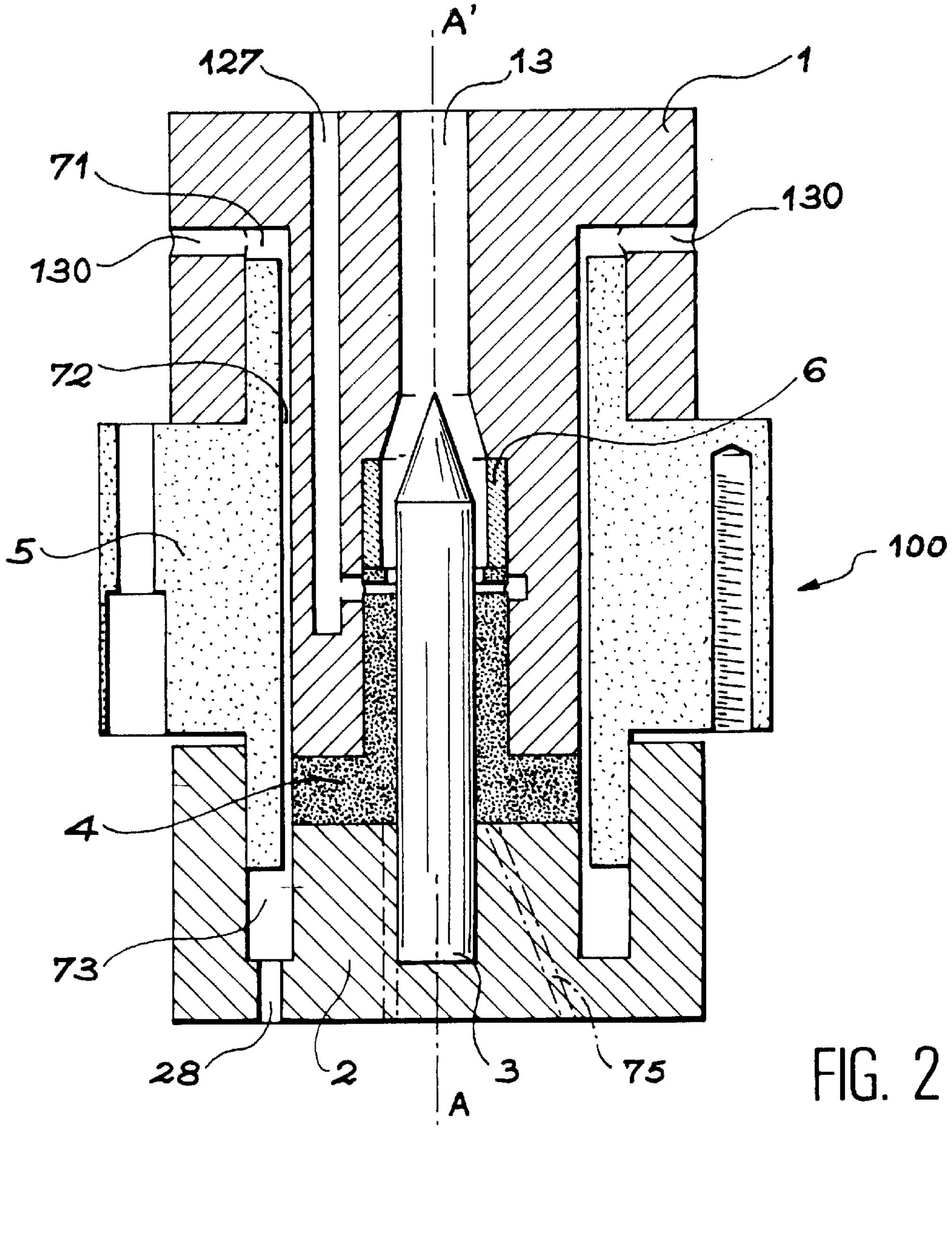
Figure 3:
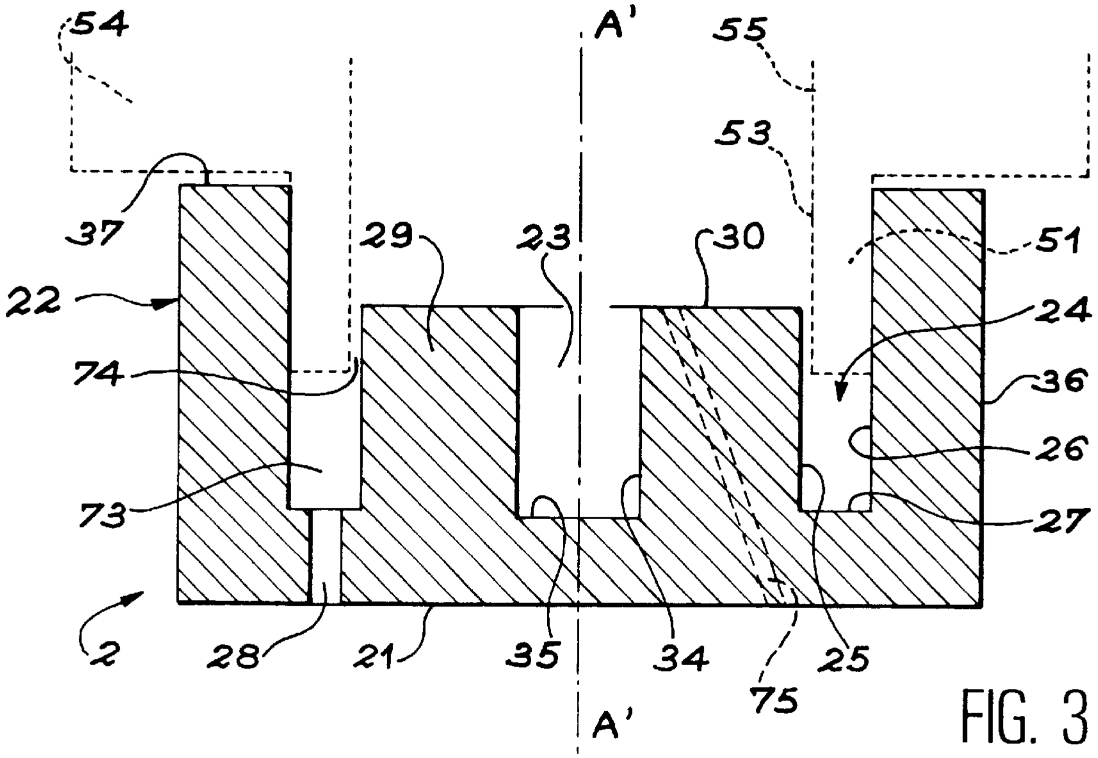
Figure 4:
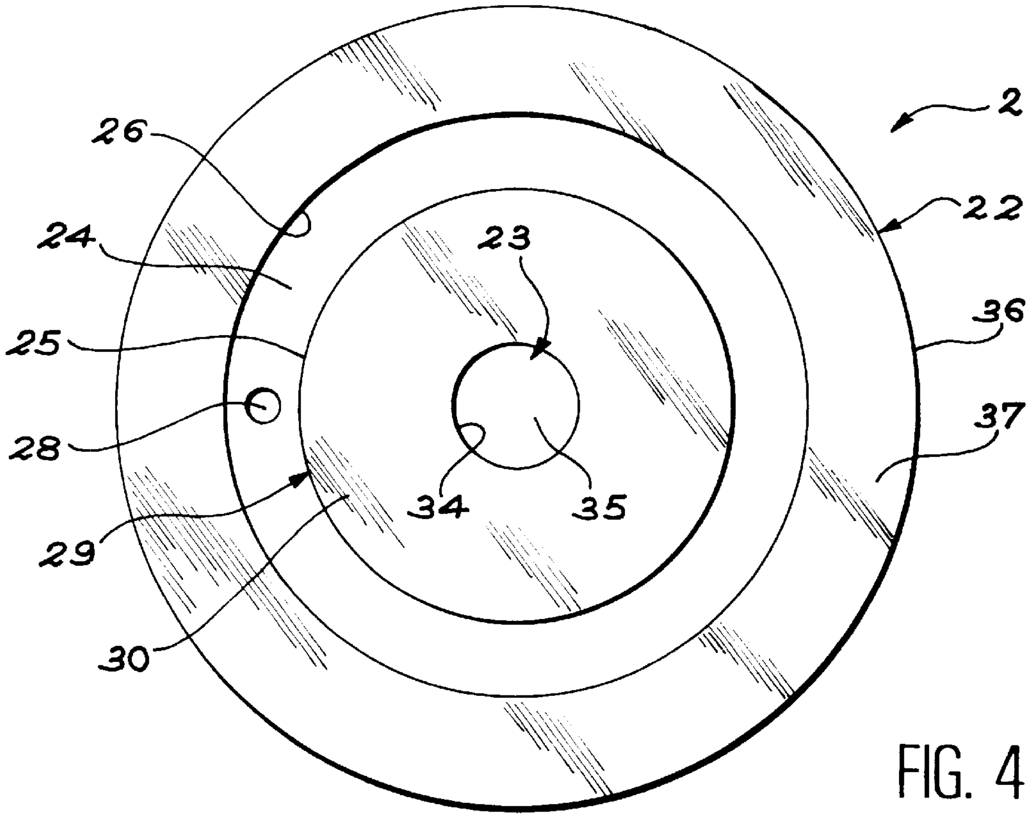
Figure 5:
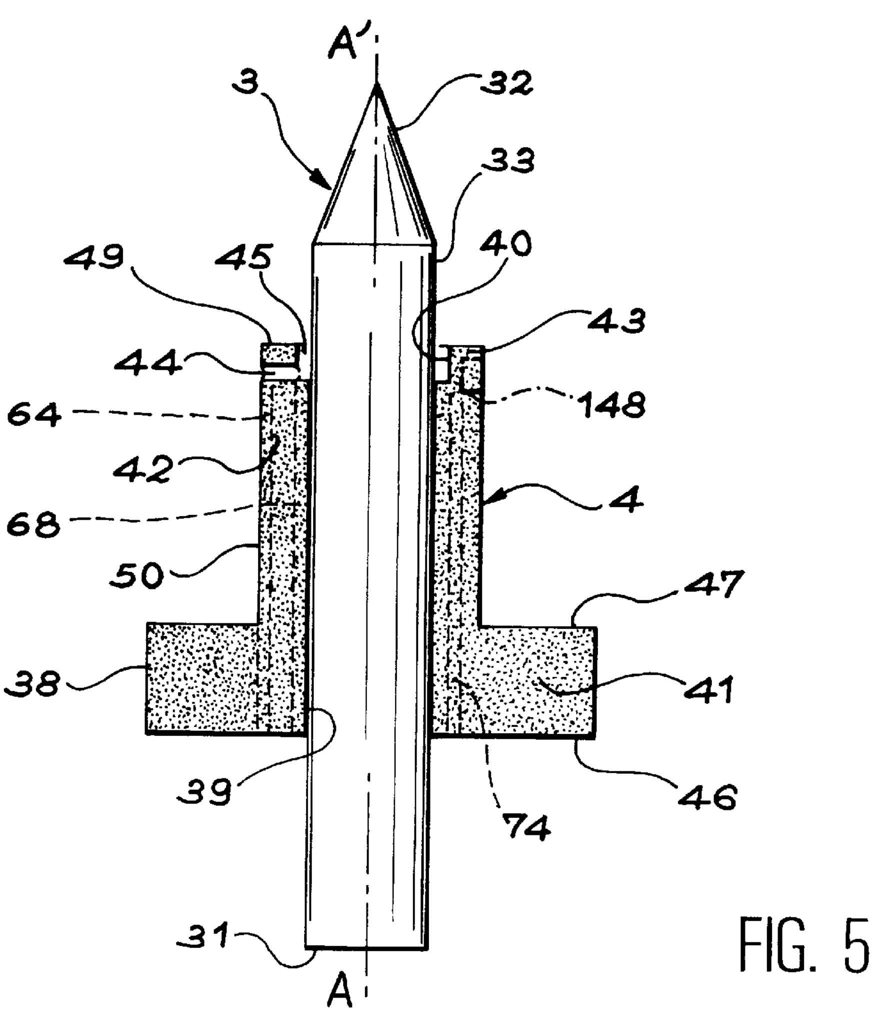
Figure 6:
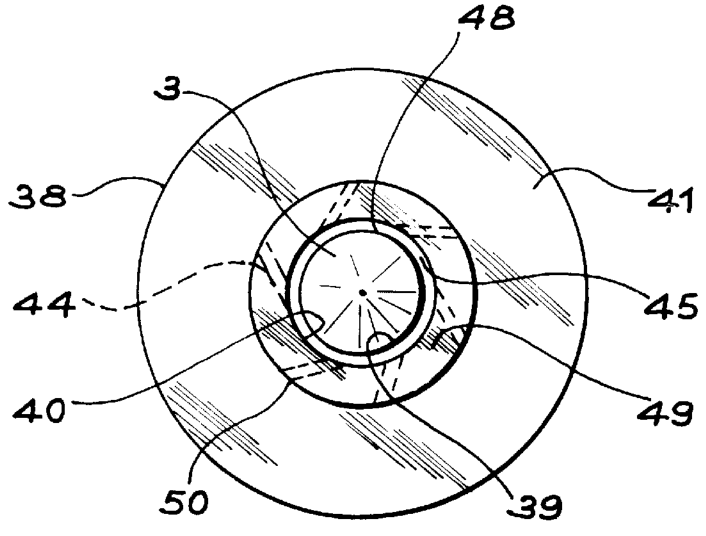
Figure 11:
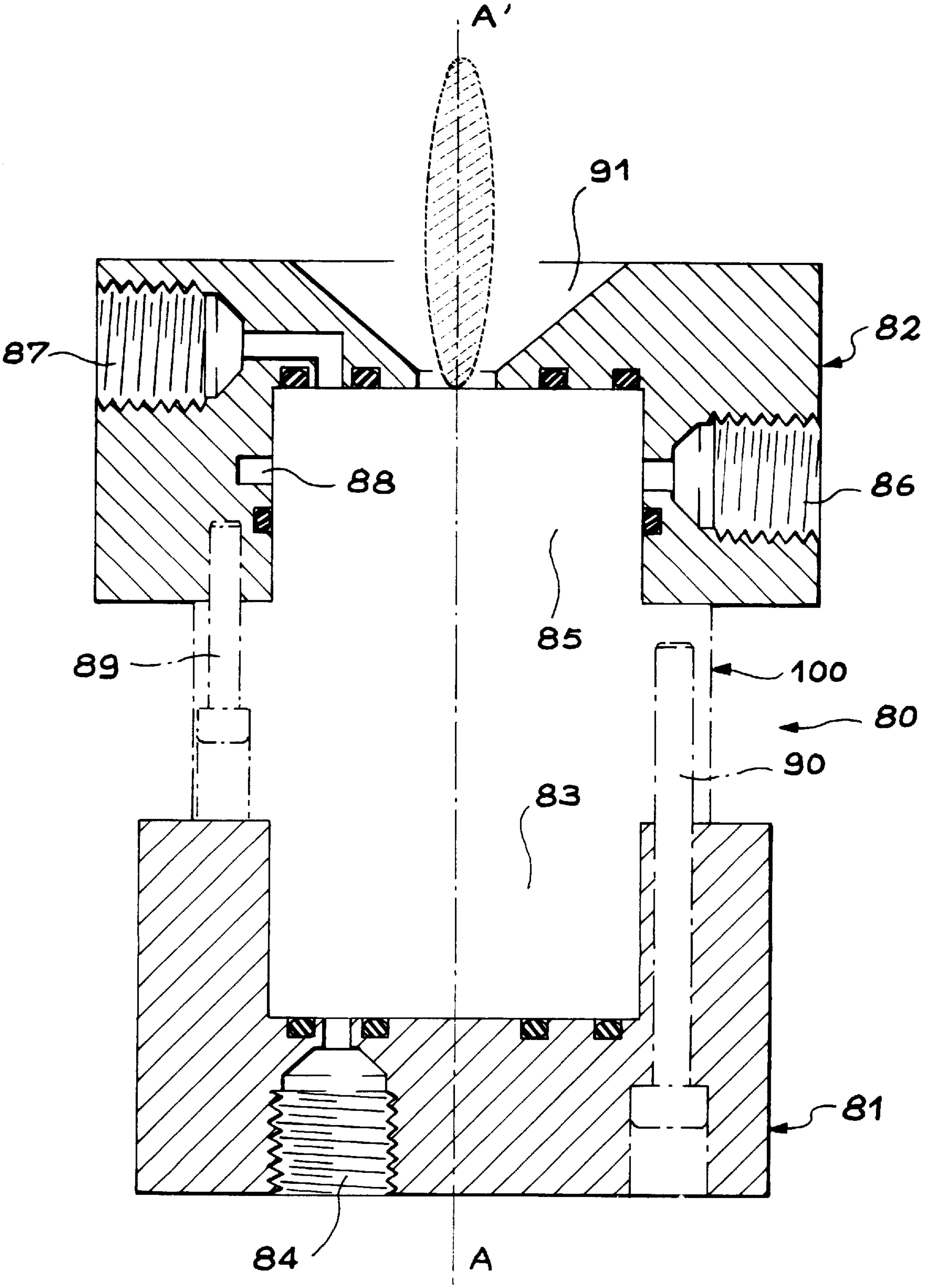
Figure 12:
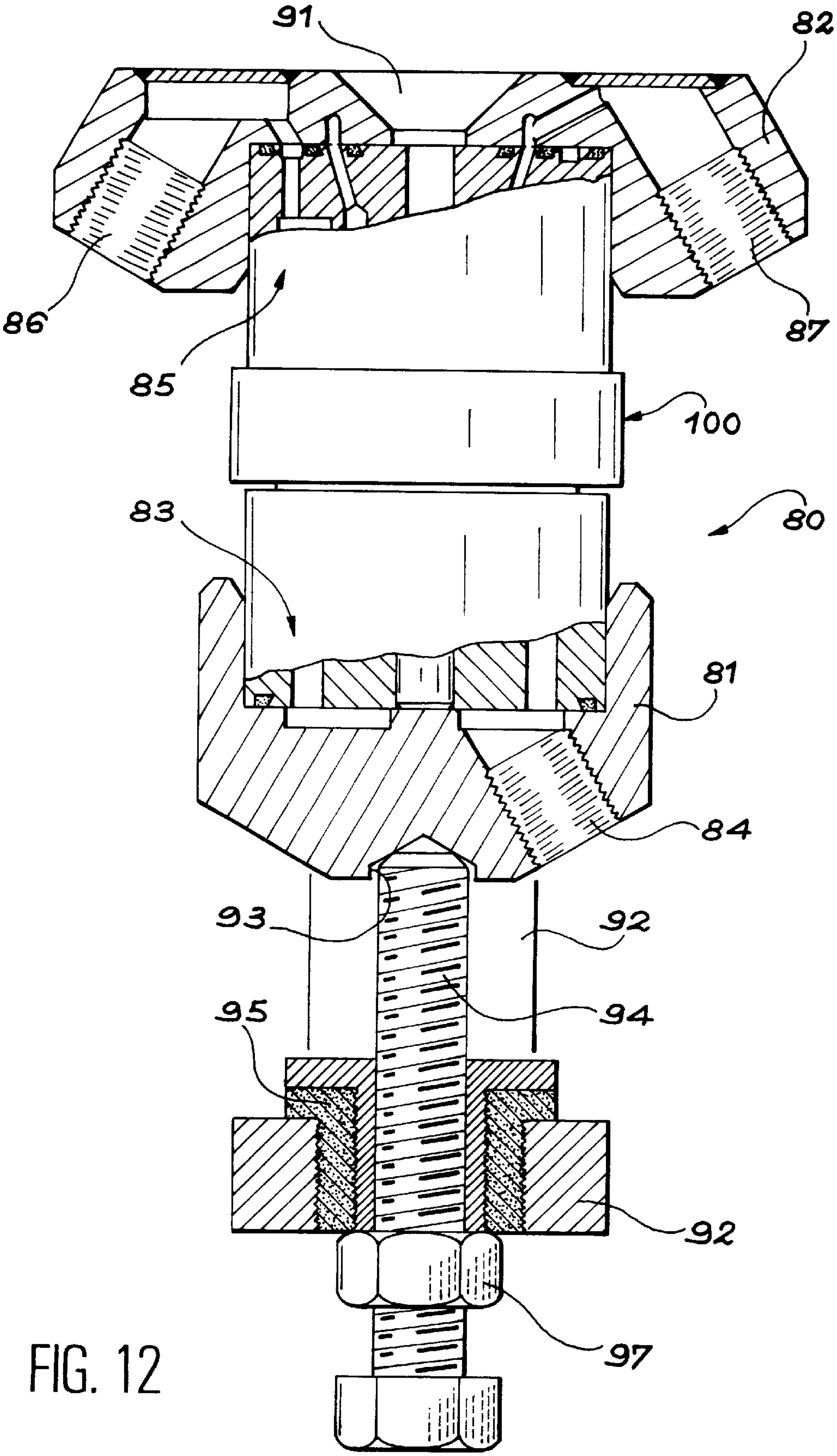
Figure 13:
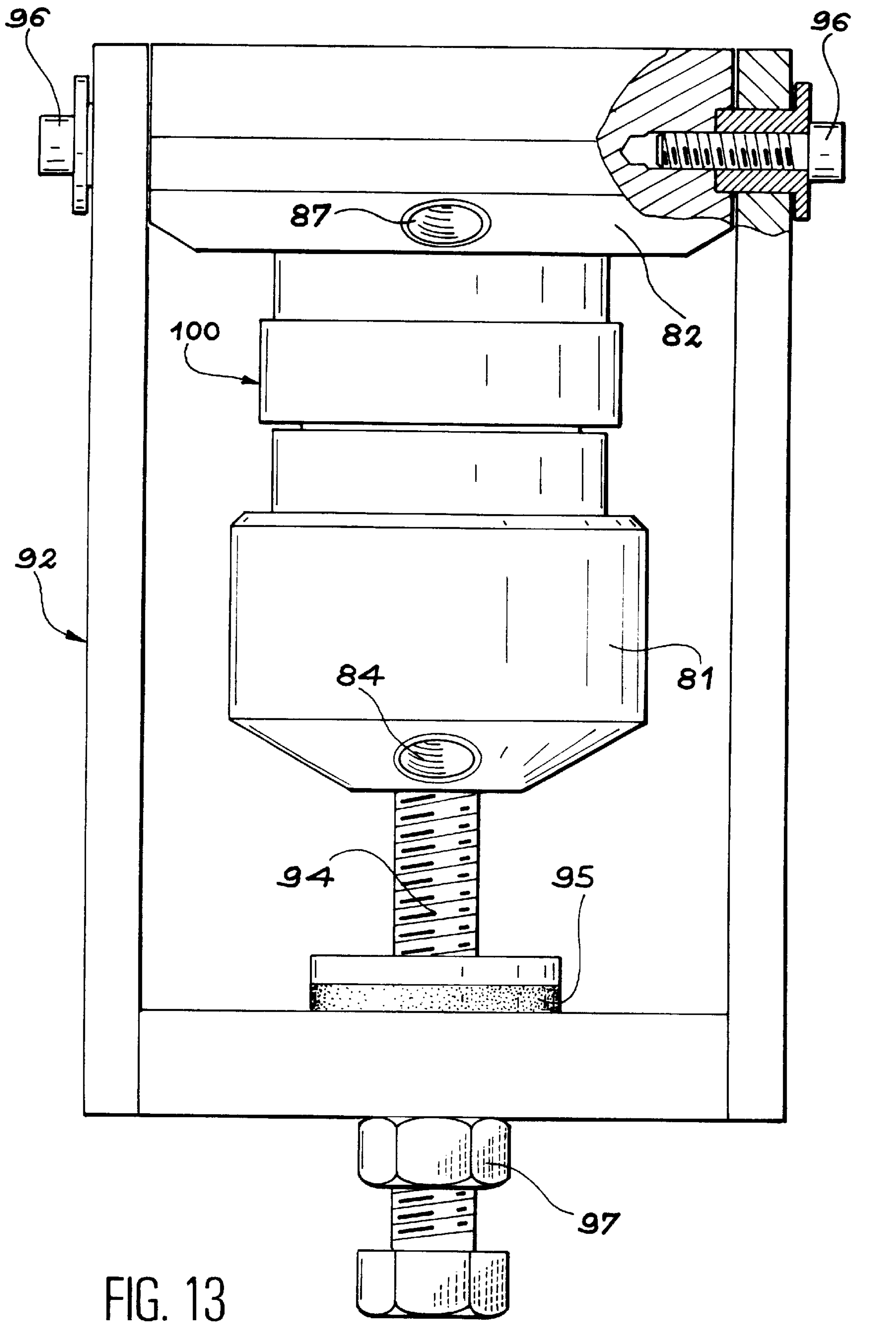

FIG. 1, already commented upon shows the principle of a plasma torch;

FIG. 2 shows an axial cross-section of a cartridge assembled according to the invention;

FIG. 3 shows an axial cross-section of a cathode support and a lower part of an assembler assembled with this support;

FIG. 4 shows a view from above of the support shown in FIG. 3;

FIG. 5 shows an axial cross-section of a cathode centring device and a cathode assembled with this centring device;

FIG. 6 shows a view from above of the centring device and of the cathode shown in FIG. 5;

FIG. 7 shows a view from above of a centring device variant and of the cathode shown in FIG. 5;

FIG. 8 shows an axial cross-section of an anode, of an insert assembled on this anode and of an upper part of an assembler assembled with this anode;

FIG. 9 shows a view from above of the anode and of the insert shown in FIG. 8;

FIG. 10 shows an axial cross-section of an assembler;

FIG. 11 shows an axial cross-section of a cartridge connecting and holding structure according to the invention assembled with a said cartridge shown diagrammatically;

FIG. 12 is an axial cross-section along a plane perpendicular to the plane in FIG. 13; and FIG. 13 is a front view of the structure 80 assembled with the cartridge 100, with a partial axial cross-section in the upper right hand corner.

DESCRIPTION OF THE PREFERRED EMBODIMENT

A cartridge example 100 according to the invention will now be described in conjunction with FIG. 2. In this embodiment example, the cartridge 100, and the parts of which it consists, have forms with a symmetry of revolution around an axis AA' constituting the axis of the cartridge.

The parts, which, when assembled, together constitute a cartridge 100 according to the invention, are 6 in number. These are:

- an anode nozzle made of electrolytic copper 1
- a cathode support made of electrolytic copper 2
- a doped tungsten cathode 3
- a cathode centring diffuser device made of plastic material 4
- an assembler made of plastic material 5
- a ceramic insert 6.

When they are assembled, parts 1 to 6 provide between them in a known way and as shown in FIG. 1, a gas circulation channel 7, an inter electrode space where an arc 8 can be created. The plasma 9, (not shown in FIG. 2), is ejected by a nozzle 13 of the anode 1.

Each of these parts and their mode of assembly will now be described.

The cathode support 2 described below, in conjunction with FIGS. 3 and 4, is a part cylindrical in shape having a symmetry of revolution around the axis AA'. It comprises a base or lower surface 21 circular in shape located in a plane perpendicular to the axis AA'. The side opposite to the base 21 comprises, from the centre to the periphery, a central bore 23, with a lateral surface 34 and a bottom 35, a groove 24 circular in revolution around AA', having two lateral edges 25, 26, an inner edge 25 and an outer edge 26, and a bottom 27. One or more through holes 28 join the bottom 27 of the groove 24 to the base 21. Between the groove 24 and the bore 23, the support 2 comprises a ring 29, having an upper surface 30 located in a plane parallel to the base 21. The lateral edges of this ring are constituted by the inner lateral edge 25 of the groove 24 and the lateral face 34 of the bore 23. In an embodiment variant where the plasmagene gas is introduced through the support 2, the support comprises one or more through conduits 75, joining, through the annular ring 29 adjoining the central bore 23, the lower surface 21 to the upper surface 30 of this ring 29. Such a conduit 75 is shown in dotted lines in FIG. 3. Lastly, the support 2 comprises a peripheral ring 22 having a lateral outer face 36 equal in diameter to that of the base 21 and an upper face 37.

The lateral edges of the ring 22 are constituted by the lateral outer face 36 of the support 2 and by the lateral outer face 26 of the groove 24.

As far as the dimensions are concerned, the diameter of the bore 23 is enough to receive in tight fit the cathode 3, which will be described later. The fit is sufficiently tight to ensure good electrical contact between the cathode support 2 and the cathode 3. The contact surface between the cathode and the anode must be as large as possible to ensure that a current of several hundred amperes can pass through with practically no losses. The width of the groove 24, i.e. the difference between the radii of the outer 26 and inner 25 edges is greater than the width (i.e. the difference between the ring outer radius and inner radius) of a first ring 51 of the assembler 5. On the other hand, the diameter of the outer wall 26 of the groove 24 is less than the outer diameter of this ring 51 of the assembler 5 in such a way that this ring 51 of the assembler 5 can be fitted tightly into the groove 24. The assembler 5 the assembly ring 51 of which is shown in FIG. 3 are described below.

The cathode 3 and the centring device 4 will now be described with reference to FIGS. 5 and 6 wherein these parts appear in the assembled position.

The cathode 3 is cylindrical in shape with a flat circular base 31 and with a conical head 32. It is included in a cathode centring device 4, shown in FIGS. 5 and 6 in position around the cathode 3.

The centring device 4 is also circular of revolution in shape around AA'. It comprises a cylindrical base part 41, extended by a cylindrical part 42 of smaller outer diameter. The inner diameter of the centring device 4 is constant over the whole height of the centring device with the exception, in a first embodiment variant, of the diameter of an upper end part 43 located on the side opposite the base 41, the diameter of which is slightly greater than the inner diameter of the base 41 and of the cylindrical extension 42. The centring device 4 comprises through holes. In the preferred embodiment these holes join the outer face 50 to the upper face 49 of the centring device 4, on which they emerge in apertures 95 shown in FIG. 7. In this preferred embodiment the axes of the holes are inclined on the axis AA', but not included in a plane containing the axis AA', so as to prompt a tangential injection of the gases, inducing an eddy called a vortex which will force the arc foot to turn in the anode so as not to remain stuck in a preferential position. In the variant with axial annular groove 45, these through holes 44 are bored in he part 43 of the centring device 4, at an axial eight located preferably at the junction with the part 42. It will be seen later that these holes 44 are intended to provide a passage for plasmagene gas towards the inter electrode space. When the gas inlet point or points are located on the support 2, it is advantageous to provide gas passages leading from the lower surface of the centring device 4 to the plasmagene gas distribution means, these means being, as will be seen later, either an axial groove 45 or the apertures 95. These passages may be constituted either by axial conduits 74 or by outer 64 or by inner 68 axial grooves, or again by combinations of conduits 74, inner grooves 68 or outer grooves 64.

The plane surfaces of the centring device 4 perpendicular to the axis AA' are constituted by the lower 46 and upper 47 surfaces of the base part 41 of the centring device 4. The lower surface 46 of the base 41 is delimited by two concentric circles, the diameter of the inner circle being equal to the inner diameter of the centring device 4, the outer diameter of this lower surface 46 being equal to the outer diameter of the base part 41. When the plasmagene gas is introduced through the support 2, the lower surface 46 of the centring device 4 can comprise a groove in which the passages 64, 68 or 74 emerge. In the assembled position, this groove is in communication with the conduits 75 of the support 2. The upper surface 47 of the base part 41 of the centring device 4 is delimited by two concentric circles, the diameter of the outer circle is equal to the outer diameter of the base part 41 and the diameter of the inner circle is equal to the outer diameter of the extension 42 of the centring device 4. The plane surfaces of the centring device 4 perpendicular to the axis AA' are also constituted, in one of the variants of the centring device 4, by the bottom 48 of a groove 45 and lastly by the upper surface of the centring device 4.

The groove bottom 45 is delimited by an outer circle, the diameter of which is equal to the inner diameter of the end part 43 and the inner diameter of which is equal to the outer diameter of the cathode 3.

Lastly, the inner axial surface of the centring device 4 is constituted by two cylindrical surfaces, a lower surface 39 corresponding to the parts 41 and 42 the diameter of which is slightly less than the diameter of the cathode 3, and in the variant with groove 45, by an upper surface 40, corresponding to the part 43 the diameter of which is greater than the diameter of the cathode 3. The lateral outer surfaces of the centring device 4 are 2 in number, a lateral lower surface 38 corresponding to the base 41 and a lateral upper surface 50 corresponding to the parts 42, 43.

As far as the dimensions are concerned, the inner diameter of the centring device 4 is, as shown above, slightly less than the outer diameter of the cathode 3, in such a way that this cathode 3 can be fixed tightly in the centring device 4. In the preferred embodiment, the diameter of the lateral lower surface 38 is equal to the diameters of the surface 25 of the support 2 and of a lateral surface 125 of a part of the anode 1, which will be considered later. These three surfaces 25, 38 and 125 are thus in the same alignment once assembly is completed. In the variant comprising an upper groove 45, the inner diameter of the end part 43 is greater than the diameter of the cathode 3, in such a way that the cathode 3 and the end part 43 together form the groove 45. It will be seen below that this groove 45 receives by means of through holes 44 a plasmagene gas.

Variants of this centring device 4 will now be described in conjunction with FIGS. 5 and 7. The function of the centring device 4 is to centre and to insulate electrically the cathode 3 relative to the anode 1. This function is provided by the lateral outer surface 50 of the upper part 42, which, as will be seen below during the description of the assembled cartridge 100, acts as support in tight assembly on a bore of the anode. The variants, which will be described below, relate to another function of the centring device 4, which is a plasmagene gas distribution function in a fully distributed way in the annular volume between the anode 1 and the cathode 3. In the embodiment described above the plasmagene gas is brought to the holes 44 by one or more conduit(s) 127 of the anode 1 emerging opposite the holes 44 or preferentially in a radial groove 135 of the anode 1 located opposite the holes 44.

According to a first embodiment variant, the plasmagene gas can be input differently.

In this first variant shown in a view from above in FIG. 7, the inner diameter of the centring device 4 is constant, from the lower surface 46 to the upper surface 49. The distribution of the plasmagene gas coming from conduits 127 of the anode 1 is provided by a radial annular groove 148 of the centring device 4 shown as dotted lines in FIG.

5. A groove is called radial when it is channelled out of a surface parallel to the axis AA'. The groove is called axial if it is channelled out of a surface perpendicular to the axis. According to this variant, the centring device 4 has several, not necessarily through, holes 144. These holes are bored from the groove 148. They each emerge in an axial aperture 95', joining in this variant the upper surface 49 of the centring device 4 to the holes 144.

According to a second variant the grooves 148 and 45 are present, the apertures 95 are not necessary. The holes 144 are through holes and join the grooves 148 and 45.

Lastly according to a third variant the holes 144 are bored directly from the lateral surface 50 of the upper part 42 of the centring device 4. It will be seen below that the holes 144 emerge in an annular radial groove 135 of the anode 1 receiving one or more conduits of plasmagene gas. At the other end the holes 144 emerge either in apertures 95 as in the first variant or in the axial grove 45. The grooves 135 of the anode and 148 of the centring device 4 can be present simultaneously.

If, as seen above, the plasmagene gas is introduced through the centring device, the interface with the gas distribution means 45, 95, is achieved by outer 64 or inner 68 axial grooves. Tightness is obtained by the fact that the centring device is fixed sufficiently tightly in the annular cavity 10 of the anode 1, or that the cathode 3 is fixed sufficiently tightly in the centring device.

The anode 1 and its ceramic insert 6 will now be described in conjunction with FIGS. 8 and 9.

The anode 1 is also a revolution part around the axis AA'. It comprises a central cavity 10 of axis AA'. This cavity is a through cavity and extends axially from an upper face 11 of the anode to a part 134 of a lower face 12 of the anode 1. The lower face 12 of the anode is located opposite the upper face 11 and consists of several parts located axially at different levels. From the upper face 11 to the part 134 of the lower face 12, the cavity 10 comprises a cylindrical upper part 13 the diameter of which is shown in FIGS. 8 and 9 approximately equal to the diameter of the cathode 3. This arrangement is in no way mandatory. The diameter and the length of the part 13 must, in a known way, be adapted to the type and to the flow rate of the plasmagene gas used, to the work power, and to the gas speeds required at the nozzle outlet. Next there is a truncated cone-shaped part 14. The diameter of the upper part of the part 14 is equal to the diameter of the part 13. The diameter of the lower part of the truncated cone-shaped part 14 is greater than that of the part 13. Lastly, there is a cylindrical lower part 15 extending axially from the lower base 16 of the truncated cone-shaped part 14 to the part 134 of the lower face 12 of the anode 1. The diameter of this part 15 of the cavity 10 is greater than the largest diameter of the truncated cone-shaped part 14. The truncated cone-shaped 14 and cylindrical 15 parts are connected by a plane 17. The ceramic insert 6 is housed in the cavity 10, in the top of the part 15. This simple part will now be described before continuing the description of the anode 1. The insert 6 is a torus shaped bush, generated by a rectangle in rotation around the axis AA'. The width of the rectangle is equal to the width of the plane 17. This width of the plane 17 itself results from the difference between the radius of the lower part 15 and the radius of the lower base 16 of the truncated cone-shaped part 14.

This insert 6 is inserted with a tight fit in such a way that its upper surface 61 acts in support on the plane 17 of the anode 1. The lateral outer surface 62 of the insert is in support on the lateral surface 18 of the part 15 of the cavity 10 of the anode 1.

The outside of the anode 1 includes the upper face 11 delimited by two circles. The diameter of the outer circle is preferably equal to the outer diameter of the support 2, the diameter of the inner circle of the upper surface 11 is equal to the diameter of the upper part 13 of the cavity 10. The outside of the anode 1 also includes a cylindrical outer face 19. The lower face 12 includes several parts located axially at different levels. From the outside towards the axis AA' is found in sequence a first ring 121. The outer diameter of this ring 121 is equal to the diameter of the peripheral cylinder 19. The inner diameter of this ring 121 is preferably equal to the outer diameter of the outer wall 26 of the groove 24 of the support 2. The lower surface 133 of this ring is a plane surface perpendicular to the axis AA'. The lower surface 133 is a part of the lower surface 12 of the anode 1.

Next is found a groove 122. This groove has a groove bottom surface 124, perpendicular to the axis AA'. This surface 124 is a part of the lower surface 12 of the anode 1. This grove 122 has a cylindrical outer wall 126 the diameter of which is equal to the inner diameter of the first ring 121. This diameter is preferably equal to the diameter of the outer wall 26 of the groove 24 of the support 2. The inner diameter of the axial groove 122 is preferably equal to the diameter of the cylindrical inner wall 25 of the groove 24 of the support 2.

Lastly a second ring 123 is found. This ring 123 has a lower surface 134, perpendicular to the axis AA'. This lower surface 134 is a part of the lower surface 12 of the anode 1. The ring 123 has a cylindrical outer wall 125 one part of which constitutes the cylindrical inner wall of the groove 122.

The cylindrical wall 125 has a diameter preferably equal to the inner diameter of the wall 25 of the groove 24 of the support 2.

One or more first conduits 127 each having two ends 128, 129 bored in the anode 1 allow a fluid to pass from one of the outer walls 11, 19 of the anode 1, to the inner wall 18 of the cavity 10. In the example shown in conjunction with FIGS. 8 and 9, the conduit 127 leads from its first end 128, in the upper surface 11 to its second end 129 located in the wall 18 of the lower part 15 of the cavity 10. It emerges in this cavity 10 at an axial level located under the insert 6. This conduit or these conduits 127 are provided for the distribution of plasmagene gas. According to a variant mentioned above in conjunction with the description of the centring device 4 and of its variants, this conduit or these conduits can alternatively emerge in a radial annular groove 135 channelled out of the lateral surface 18 of the cavity 10 of the anode 1, instead of emerging directly on this surface 18. In the preferred embodiment shown in FIGS. 8 and 9 the conduit or conduits 127 are parallel to the axis AA', they are located in the ring 123 concealing the central cavity 10, and they emerge in the groove 135.

It should be noted that according to variants the outer end 128 of the first conduits 127 or at least of a part of them can be located on an outer wall of the cartridge 100 without this wall being a wall of the anode 1. This could for example be a conduit (not shown) parallel to the axis AA' rising from the base of the support 2 through this support and the centring device. According to a variant of this embodiment a part of the conduit or conduits 127 could be constituted by axial grooves of the centring device 4 parallel to the axis AA'.

One or more second conduits 130 each having two ends 131, 132 lead(s) from one of the outer walls 11, 19 of the anode 1 to the groove 122. In the example shown in conjunction with FIGS. 8 and 9, the conduit 130 has its first end 131 in the peripheral cylinder 19 and its second end 132 emerges in the groove 122 in the bottom 124 of this groove.

It should be noted that according to variants the outer end 131 of the second conduits or at least of a part of them may be located on an outer wall of the cartridge 100 without this wall being a wall of the anode 1. This could for example be an outer wall of the assembler 5 or of the support 2.

The mode of assembly and the assembly of parts 16, which together constitute a cartridge 100 for a plasma torch according to the invention, will now be described in conjunction with FIGS. 2, 3, 5 and 8.

First of all, the assembler 5 will be described in conjunction with FIGS. 3, 8 and 10.

In FIGS. 3 and 8 the lower and upper parts of the assembler 5 have been shown so as to show this assembler 5 in position relative to the support 2 (FIG. 3) and to the anode 1 (FIG. 8) respectively.

The assembler 5 is shown in axial cross-section in FIG. 10.

The assembler 5 comprises a lower cylindrical ring 51. The diameter of the cylindrical outer surface 52 of this ring 51 is slightly greater than the diameter of the wall 26 of the groove 24 of the support 2, such that this ring 51 can be fixed in tight assembly into this groove 24. The diameter of the inner wall 53 of this ring 51 is greater, at least for one part, which, in the assembled position, is fixed in this groove 24, to the diameter of the inner wall 25 of the groove 24 of the support 2. In this way an annular axial volume 77 is provided between these two walls 25, 53. The ring 51 has a lower surface 59 perpendicular to the axis AA'. In the assembled position this surface 59 is not in contact with the surface 27 of the bottom of the groove 24. In this way an annular volume 73 is provided between these two surfaces.

This ring 51 is extended by a central part 54 also ring shaped. The diameter of the inner wall 55 of this ring 54 is greater than the diameter of the cylindrical wall 125 of the anode 1. In this way an annular axial volume 72 is provided between these two walls 55, 125. It should be remembered that the wall 125 extends axially from the bottom 124 of the groove 122 of the anode 1 to the lower surface 134 of the second ring 123 of the anode 1. This lower surface 134 constitutes the lowest surface of the anode 1.

The upper part of the assembler 5 shown in the assembled position in FIG. 8 is also in the shape of a ring 56. The diameter of the outer wall 57 of this ring is greater than the outer diameter of the outer wall 126 of the groove 122 of the anode 1. The difference in size between the diameter of the outer wall 57 of the ring 56 and the diameter of the wall 126 is such that this ring 56 can be fixed in tight assembly in the groove 122.

The diameter of the inner wall 58 of the ring 56 is greater than the diameter of the wall 125 of the anode 1. In this way an annular axial volume 76 is provided between these two walls 58, 125. It should be remembered that this wall 125 of the anode 1 extends axially from the bottom 124 of the groove 122 to the part 134 of the lower surface 12 of the anode 1, which is located at the lowest level of the anode. The ring 56 has an upper surface 60. In the assembled position this surface 60 is not in contact with the surface 124 of the bottom of the groove 122. In this way an annular volume 71 is provided between these two surfaces.

The central part of the assembler 5 has an upper surface 65, a lower surface 66 both perpendicular to the axis AA', and a lateral outer surface 67.

The upper surface 65 of the central part 54 of the assembler 5 is delimited by a circle, the diameter of which is the outer diameter of the ring 56 and a circle, the diameter of which is the diameter of the lateral outer surface 67 of the central part 54.

Likewise, the lower surface 66 of the central part 54 of the assembler 5 is delimited by a circle, the diameter of which is the outer diameter of the lower ring 51 and a circle, the diameter of which is the diameter of the lateral outer surface 67.

The circles delimiting the upper 65 and lower 66 surfaces are concentric. In the example shown in the figures the inner diameter of the central axial cavity 69 is constant in such a way that the inner axial surfaces 58, 55, 53 of this cavity form only a single and same surface. This characteristic simplifies manufacture but is in no way mandatory.

To sum up, the assembler 5 is presented as a revolution part having a central through axial cavity 69. It comprises a central part 54 from which cylindrical parts 56, 51, of outer diameter smaller than the outer diameter of the central part 54, shoot upwards and downwards respectively. It will be seen later that, in a first embodiment example of the holding structure, the shoulder forming the central part 54 is used to house through holes and tapped holes. In this embodiment these holes form a part of the means of fixing the cartridge 100 to the holding and connecting structure. The other part of these means is constituted by tapped or untapped holes of the holding and connecting structure and by screws or bolts or nuts. In this embodiment the central part 54 provides another function. One of the upper 65 or lower 66 surfaces acts as an assembly stop. In the example shown in FIG. 2, the lower surface 133 of the ring 121 of the anode 1 acts as a stop on the upper surface 65 of the central part 54. Conversely a functional play is provided between the upper surface 37 of the ring 22 of the support 2 of the cathode 3 and the lower surface 66 of the central part 54. By means of this stop 65 and of an adapted dimensioning of the grooves 122 and 24 and the axial lengths of the rings 56, 51 it is possible to be sure of providing the annular spaces 71 and 73. The same stop function could be obtained by giving the bottoms of the groove 122 or 24 a rounded or conical shape, the width at the groove bottom getting smaller with the depth of penetration. The functional play also allows contact to be provided between the surfaces 30 of the support 2 and 46 of the centring device 4, as well as between the surfaces 134 of the anode 1 and 47 of the centring device 4.

According to an embodiment variant, the assembler 5 may be constituted by a straight cylinder with a central axial cavity, the inner and outer diameters of the assembler being constant from the lower surface 59 to the upper surface 60.

Torch assembly will now be described.

The insert 6 is placed in position as described above in the anode 1. The cathode 3 is inserted into the bore 23 of the support 2, the lower face 31 of the cathode coming into contact with the bottom 35 of the bore 23, the lateral face of the cathode being in contact, by means of tight assembly, with the lateral surface 34 of the bore 23. In this way an electrical contact between the cathode 3 and the support 2 is provided over all the surfaces in relation to the support 2 and the cathode 3. The centring device 4 is placed around the cathode 3 as described above. The lower face 46 of the centring device 4 is in contact with the upper face 30 of the ring 29. The assembler 5 is then put in position under pressure, the groove 122 of the anode 1 receiving the ring 56 of the assembler 5. The upper part of the ring 56 and/or the edges of the groove 122 may be bevelled or chamfered to facilitate insertion. When the assembler 5 is in place the lower surface 133 of the ring 121 of the anode 1 is stopped against the upper surface 65 of the central part 54 of the assembler 5. The upper surface 60 of the assembler 5 is not at the bottom of the groove 122, which means that an annular volume 71 is, as already indicated above, provided between the lower surface 124 of the groove 122 of the anode 1 and the upper surface 60 of the ring 56. The anode 1 and its insert 6 thus assembled with the assembler 5 is then assembled with the support unit 2, cathode 3 and centring device 4, the ring 51 inserting itself under pressure in the groove 24 of the support 2. To facilitate insertion, the bottom of the ring 51 and the top of the grove 24 may be bevelled or chamfered. When the fixing operation is finished, a functional play subsists as shown in an exaggerated way in FIG. 2, between the lower surface 66 of the central part 54 of the assembler 5 and the upper face 37 of the ring 22 of the support 2. The lower surface 59 of the ring 51 of the assembler 5 is not in contact with the groove bottom 27 of the groove 24, an annular volume 73 is therefore, as already indicated above, provided between the lower surfaces 59 of the ring 51 and 27 of the support 2. It will be seen later that this annular volume 73 provided between these two surfaces is intended to collect the cooling water.

The operation of the torch will now be clarified.

As a torch, the operation is the usual operation of a torch, but the cooling water inflow circuit and the plasmagene gas circuit will now be commented upon. It should firstly be remembered that, in the example shown, the inner walls 53 of the lower ring 51, 55 of the central part 54 and 58 of the upper ring 56 of the assembler 5 are aligned. It should also be remembered that the inner diameter of the assembler 5 is greater than the outer diameter of the ring 123 of the anode 1, than the diameter of the lateral outer surface 38 of the centring device 4 and than the diameter of the inner wall of the groove 24 of the support 2 in such a way that an annular volume 72 is provided. This annular volume 72 extends axially from the upper part 60 of the ring 56 to the lower part 59 of the ring 51 of the assembler 5. In the most general case this annular volume is formed by the annular volumes 76, 72 and 77 and by any annular volumes connecting between these different volume parts. The water is brought via the opening 131, and through the conduit 130 onto the outer surface of the anode 1, the inner end 132 of the conduit 130 emerges in the annular volume 71 provided between the surfaces 124 and 60 of the groove 122 and of the ring 56 respectively. This water may flow along the inner wall 125 of the anode 1 through the annular volume or volumes 72 to the annular volume 73 provided between the bottom of the annular ring 51 and the bottom 27 of the groove 24. This water flows via the conduit or conduits 28 provided in the bottom of the annular groove 24. It can thus be seen that the water circuit is provided without a tightness seal internal to the torch, by means of the tight assembly of the rings 51 and 56 in the grooves 24 and 122 respectively. Naturally the water inflows and outflows could be placed differently, the important thing being that a water circulation cools a ring of the anode 1.

Likewise, the inflow of plasmagene gas via the opening 128 in the anode 1 occurs without a seal, the gas emerging via the conduits 44 or 144 in the openings 95 arranged around the cathode 3 on the centring device 4, or in the groove 45, according to the embodiment variants. The torch assembled according to the invention therefore includes only six parts, the anode 1, the support 2, the cathode 3, the centring device 4, the assembler 5 and the insert 6. This torch can be assembled with fewer operations under pressure if specialist tools are available for lateral holding of the parts to be assembled.

With regard to the functions of the different parts making up the assembled cartridge 100 it will be observed that if the cathode 3 is sufficiently tight in the bore 23 of the support 2, the support 2, the cathode 3, the centring device 4, the part 42 of which is tight in the cavity 10 of the anode 1, and the anode 1 form an assembled unit. In these conditions the assembler 5 engaged with the grooves 24 of the support 2 and 122 of the anode may be considered merely as a part of the water circuit. It will also be seen later that the cartridge 100 assembly may be consolidated by mounting the cartridge 100 in position in the holding and connecting structure.

It will also be observed that if the cartridge 100 is as simple as it is, this stems from the overall architecture of the cartridge. Thus the plasmagene gas circuit is in its entirety in a central part of the assembled cartridge 100. It may be a central part of the anode 1, in the shape of a ring 123, this ring being immediately next to the central cavity 10 of the anode. It may also be conduits 75 passing through the support 2 so as to be in communication with the passages 64, 68, 74 of the centring device. As for the water circuit, this is at the periphery of this same ring 123 adjoining the central cavity 10 in such a way that there is no crossing of water or gas circuits.

It should be pointed out that the assembler has been presented as a distinct part of the support. This is due to the fact that the assembler, which joins the support made of a conductive material in contact with the cathode, is in contact with the anode. It is therefore made of an electrically insulating material to avoid a short circuit between the anode and the cathode. It is obviously possible to make the support of an insulating material comprising feed-through conductors to connect the cathode. In this case it may be considered that the assembler is constituted of the parts made of insulating material, and the support by the parts made of conductive material.

A few remarks relating to the materials of the components of the cartridge 100 will now be made.

The anode 1 and the cathode support 2 which, in the embodiment example, are made of electrolytic copper could be made of any material, for example metal, electrically conductive and allowing the drainage of very high thermal flows.

The doped tungsten of the cathode 3 could be manufactured in any metal material having a low electron extraction potential.

The centring diffuser device 4 may be manufactured in any plastic material fitting assembly requirements and having good resistance to bulking in water, a strong dielectric character and good mechanical resistance to radiation and to temperature.

The assembler body 5 may be manufactured in a plastic material fitting the requirements of assembly by simple plastic pressure.

The insulating insert 6 may be manufactured in a ceramic material having good resistance to thermal shocks, to radiation and having a strong dielectric character, for example boron nitride.

It has been seen that the assemblies are of the tight fit type made under pressure, which implies an adapted material pair: In the case of the torch presented, the assemblies are constituted by plastic—copper alloy or tungsten alloy—copper alloy pairs.

Other material pairs are conceivable, in particular ceramic materials could replace the plastic materials, if a vibrator were to be interposed, in a known way, between the pressure head and the assembly press jack.

Two examples of a connecting and holding structure of the cartridge 100 will now be briefly described in conjunction with FIGS. 11, 12 and 13. A first connecting and holding structure 80, shown in FIG. 11 along an axial cross-section, comprises two parts both of revolution around the axis AA'. A lower part 81 conceals a bore 83 the inner diameter of which is equal to the outer diameter of the support 2, in such a way that this support 2 can easily be inserted into this part 81. The example shown in FIG. 11 corresponds to one of the embodiment variants of the cartridge 100 wherein cooling fluid drainage is done via the conduit or conduits 28 of the support 2. This is why in this example the lower part 81 comprises a water outflow and a current inflow shown as 84. One or more O-rings make it possible in a known way for tightness to be ensured.

An upper part 82 of the holding and connecting structure conceals a bore 85 the inner diameter of which is equal to the outer diameter of the anode 1, in such a way that this anode 1 can easily be inserted into this part 82. This structure 82 comprises a central axial hole 91 with flared edges allowing the plasma to pass. The example shown in FIG. 11 corresponds to one of the embodiment variants of the cartridge 100 wherein the cooling fluid and plasmagene gas inflow takes place via the conduit or conduits 130 and 127 of the anode 1 for the inflow of water and gas respectively. This is why in this example the upper part 82 comprises a water inflow 86 and a gas inflow 87. One or more O-rings make it possible in a known way for tightness to be ensured. The water inflow 86 emerges opposite the conduit 130 of the anode 1. When there are several conduits 130 a radial groove 88 receiving the water inflow 86 allows distribution to the different conduits. Likewise in respect of the gas inflow, when there are several conduits 127, an axial groove, not shown, receiving the gas inflow 87, allows distribution to the different conduits 127.

The main advantage of this structure 80 is the capacity for rapid exchange of the cartridge 100. In respect of assembly, the upper part of the cartridge, i.e. that corresponding to the anode 1, is inserted into the upper part 82 of the structure 80. To facilitate radial positioning, making it possible to make the water and gas inflows correspond fully with the orifices 128, 131 of the anode, locating pins can be provided on the upper part 82 and on the anode 1. When it is in place the cartridge 100 is screwed onto the upper part 82 by means of screws 89 passing through holes of the assembler 5 and being screwed into tapped holes of the upper part 82. The lower part 81 is then put in place by inserting the support 2 into the bore 83. Means can also be provided to facilitate a correct radial positioning. Screws 90 allow the lower part 81 to be fixed to the assembler. These screws pass through holes of the assembler 5 and are screwed into tapped holes of the lower part 81.

A currently preferred embodiment of the structure 80 will now be given in conjunction with FIGS. 12 and 13. FIG. 13 is a front view of the structure 80 assembled with the cartridge 100, with a partial axial cross-section in the upper right hand corner. FIG. 12 is an axial cross-section along a plane perpendicular to the plane in FIG. 13.

According to this embodiment the lower 81 and upper 82 end plates and the cartridge 100 are kept assembled by means of a stirrup piece 92. This stirrup piece 92 is U shaped. Two parallel arms of the U are fixed rotationally by means of screws 96 perpendicular to the axis AA' to the upper end plate 82. Bushes and insulating washers are provided in a known way to prevent electrical contacts between the stirrup piece and the end plate 82. The lower end plate 81 is fitted on its lower face with a central indentation 93. In the assembled position a screw 94 mounted in the horizontal part of the U of the stirrup piece 92 blocks the rotation of the stirrup piece 92 around the screws 96 and exerts a pressure in the indentation 93, preventing movement of the end plates 82 and 81 in the axial direction. Electrical insulation of the end plate 81 and of the stirrup piece is obtained by means of an insulating bush 95 and of insulating washers. A blocking locknut 97 is provided. The distance between the horizontal arm of the stirrup piece 92 and the lower face of the end plate 81 is sufficient to allow the disengagement of the cartridge 100 from the bores 83 and 85 of the end plates 81 and 82 respectively.

The operation is as follows:

To dismantle the cartridge 100 the locknut 97 is unlocked and the screw 94 unscrewed until the cartridge 100 can be extracted from one of the end plates 81 or 82. In this position the end plate 82 is still integral with the stirrup piece 92 and the end plate 81 is held in place, the screw 94 still within the indentation 93. In this position of the end plates the cartridge 100 can be extracted from the other end plate by a slight rotation of the stirrup piece 92 around the axis formed by the screws 96. This rotation releases the passage of the cartridge 100. For re-assembly the reverse procedure is instigated.

This mode of assembly is advantageous from the mechanical point of view since it allows an assembly pressure to be exerted on the end plates 81, 82 and on the cartridge 100, which is automatically axial. There is no risk of dissymmetrical pressures creating a lateral distortion constraint. It is also advantageous since it allows the cartridge 100 to be assembled and dismantled by means of a single screw without the end plates 81, 82, needing to be held in place, which is particularly advantageous when working in a glove box.

Naturally other mechanical means of fixing the cartridge 100 to the structure 80 are within the capability of the man skilled in the art.

Tightness is provided by seals and by the fact that the cartridge 100 is fitted in the bores 83, 85.

Adaptations of the structure 80 needed to make it compatible with the variants described in relation to the cartridge 100 relative to water or gas inflow and outflow points are within the capability of the man skilled in the art and will not be commented upon.

What is claimed is:

1. A cartridge (100) generating plasma for a plasma torch, having, centered on an axis AA', an annular anode (1) comprising a central cavity (10) formed inside a central ring (123) of the anode (1), this central cavity (10) receiving a cathode (3) centred on AA', means (2, 23, 4) for positioning the cathode (3), the anode (1) and the cathode (3) providing between them an annular space for producing an arc, plasmagene gas distribution means, the distributed gas circulating in the annular space between the cathode (3) and the anode (1), anode (1) cooling means, comprising particularly conduits for an anode (1) cooling fluid, these conduits having an inlet and an outlet, assembly means, comprising particularly a cathode (3) support (2), a cartridge characterised in that the cathode support (2) has a conductive part to bring the electrical currents necessary for the operation of the torch from a current input to the cathode (3), and in that the assembly means additionally comprise an assembler (5) the cathode (3) support (2), the assembler (5) and the annular anode (1) comprising hollow parts (24, 122) and projecting parts (51, 56) all centred parallel to the axis AA', the projecting parts (51, 56) being fitted tightly into the hollow arts (24, 122).

2. A cartridge according to claim 1 characterised in that one or more hollow part(s) (24, 122) are constituted by annular grooves (24, 122) and in that one or more projecting parts (51, 56) are constituted by annular rings (51, 56), the outer diameter of the rings (51, 56) being greater than the outer diameter of the grooves (24, 122) in such a way that one or more annular rings (51, 56) are fitted tightly into one or more annular grooves (24, 122).

3. A cartridge according to claim 2 characterised in that a projecting part (51) of the assembler (5) is constituted by a lower annular ring (51) of axis AA', having an outer diameter, an inner diameter and a lower surface, in that a hollow part (24) of the cathode (3) support (2) is constituted by an annular groove (24) centred on the axis AA', the groove (24) having an outer diameter, an inner diameter and a groove (24) bottom surface (27), and in that the outer diameter of the lower annular ring (51) of the assembler (5) is slightly greater than the outer diameter of the annular groove (24) of the cathode (3) support (2) in such a way that the lower annular ring (51) of the assembler (5) is fitted tightly into the annular groove (24) of the cathode (3) support (2).

4. A cartridge (100) according to claim 3 characterised in that a projecting part (56) of the assembler (5) is constituted by an upper annular ring (56) of axis AA', having an outer diameter, an inner diameter and an upper surface, in that a hollow part (122) of the annular anode (1) is constituted by an annular groove (122) centred on the axis AA', the groove (122) having an outer diameter, an inner diameter and a groove bottom surface (124), and in that the outer diameter of the upper annular ring (56) of the assembler (5) is slightly greater than the outer diameter of the annular groove (122) of the anode (1) in such a way that the upper annular ring (56) of the assembler (5) is fitted tightly into the annular groove (122) of the anode (1).

5. A cartridge (100) according to claim 2 characterised in that a first projecting part (51) of the assembler (5) is constituted by a lower annular ring (51) of axis AA', having an outer diameter, an inner diameter and a lower surface (59), in that a hollow part (24) of the cathode (3) support (2) is constituted by an annular groove (24) centred on the axis AA', the groove (24) having an outer diameter, an inner diameter and a groove bottom surface (27), and in that the outer diameter of the first annular ring (51) of the assembler (5) is slightly greater than the outer diameter of the annular groove (24) of the cathode (3) support (2) in such a way that the lower annular ring (51) of the assembler (5) is fitted tightly into the annular groove (24) of the cathode (3) support (2), and in that a second projecting part (56) of the assembler (5) is constituted by an upper annular ring (56) of axis AA', having an outer diameter, an inner diameter and an upper surface (60), in that a hollow part (122) of the annular anode (1) is constituted by an annular groove (122) centred on the axis AA', the groove having an outer diameter, an inner diameter and a groove bottom surface (124), and in that the outer diameter of the second annular ring (56) of the assembler (5) is slightly greater than the outer diameter of the annular groove (122) of the anode (1) in such a way that the upper annular ring (56) of the assembler (5) is fitted tightly into the annular groove (122) of the anode (1).

6. A cartridge (100) according to claim 5 characterised in that the assembler (5) comprises a central hollow part (69) joining the lower and upper rings (51, 56), this central part (69) having an inner diameter, in that the groove (122) of the anode (1) receiving the upper ring (56) of the assembler (5) is peripheral of the central ring (123) of the anode (1), forming the central cavity (10) of the anode (1), the inner diameter of a part at least of the assembler (5) being greater than the outer diameter of the central ring (123) of the anode (1) in such a way that a first annular volume (72) is provided between the assembler (5) and the central ring (123) of the anode (1), this volume (72) being in communication with the outside of the cartridge (100) through at least two conduits (130, 28), a cooling fluid inflow conduit (13) and a cooling fluid outflow conduit (28).

7. A cartridge (100) according to claim 6 characterised in that, in the assembled position, the upper surface (60) of the upper ring of the assembler (5) does not abut the groove bottom (124) of the anode (1), in such a way that a second annular volume (71) is provided between this upper surface (60) and the groove bottom (124), one (130) of the conduits communicating with the outside emerging in this volume (71).

8. A cartridge (100) according to claim 6 characterised in that, in the assembled position, the lower surface (59) of the lower ring (51) of the assembler (5) does not abut the bottom (27) of the groove (24) of the support (2), in such a way that a third annular volume (73) is provided between this lower surface (59) and the bottom (27) of the groove (24), one of the conduits (28) communicating with the outside emerging in this volume (73),

9. A cartridge (100) according to claim 1 characterised in that it comprises a centring device (4) having an axial cavity centred on the cathode (3), a lower surface (46), a lateral outer surface (38, 50), a lateral inner surface (39), an upper surface (48, 49) at least one upper part (42) of the centring device (4) being fitted inside the central cavity (10) of the anode (1), one or more passages (44, 144, 95, 45, 64, 68, 74) bringing into communication the lateral outer or lower surface (50, 46) with the upper surface (48, 49) of the upper part (42) of the centring device (4).

10. A cartridge (100) according to claim 9 characterised in that passages (44, 144) are constituted by conduits (44, 144) joining the lateral outer surface (50) of the centring device (4) either in an axial annular groove (45) of the centring device (4) formed between the centring device (4) and the cathode (3) by a detachment from the lateral inner surface (39) of the centring device (4), or in apertures 95 formed on the upper surface (49) of the centring device (4).

11. A cartridge (100) according to claim 10 characterised in that conduits (44, 144) have an axial line not contained in an axial plane of the centring device (4).

12. A cartridge (100) according to claim 10 characterised in that conduits (44, 144) have an end emerging in a radial groove (148) formed on the lateral outer surface (50) of the centring device (4).

13. A cartridge (100) according to claim 10 characterised in that conduits (44, 144) have an end emerging in a radial inner groove (135) of the inner cavity (10) of the anode (1).

14. A cartridge (100) according to claim 9 characterised in that the anode (1) is fitted with one or more conduits (127) passing axially through a central ring (123) of the anode (1) surrounding the central cavity (10) of the anode (1) and emerging opposite one end of the passages (44, 144) of the centring device (4).

15. A cartridge (100) according to claim 9 characterised in that the support (2) is fitted with one or more conduits (75) passing through the support (2) and communicating with passages (64, 68, 74) of the centring device (4).

16. A cartridge (100) according to claim 9 characterised in that the support (2) is fitted with a central bore (23), this bore (23) housing a lower part of the cathode (3).

17. A cartridge (100) according to claim 16 characterised in that the support (2) is fitted with a central ring (29) formed around the bore (23) housing the lower part of the cathode (3), an upper surface (30) of this ring (29) being in contact with the lower surface (46) of the centring device (4).

18. A cartridge (100) according to claim 17 characterised in that the centring device (4) is fitted with a lower shoulder (41) having a lower surface (46) and an upper surface (47), the lower surface of this shoulder constituting the lower surface (46) of the centring device (4), and the upper surface (47) of this shoulder (41) being in contact with a lower surface (134) of the central ring (123) of the anode (1).

19. A plasma torch characterised in that it comprises a structure for connecting and holding in place a cartridge (100) for a plasma torch according to claim 1, this structure having an upper part (82) comprising a bore (83) for receiving the anode (1) of the cartridge (100), a central axial hole (91) the diameter of which is at least equal to or greater than the diameter of the upper part (13) of the central cavity (10) of the anode (1), and a lower part (81) comprising a bore (83) for receiving the support (2) of the cartridge, the structure having means (89, 90, 92, 96, 97) of fixing to the cartridge (100) and carrying inlets (86, 87) for a cooling fluid, plasmagene gas, and means (84) of draining the cooling fluid these means positioning themselves, when the cartridge (100) is assembled in the structure (80), opposite the corresponding conduits (127, 130, 75) of the cartridge (100).

20. A plasma torch according to claim 19 characterised in that the means of fixing to the cartridge (100) the fixing and holding structure (80) comprises a stirrup piece (92) fixed rotationally to the upper part (82) of the structure (80) comprising the bore (85) for receiving the anode (1) of the cartridge, a screw (94) mounted in the stirrup piece (92) acting as support on the lower part (81) of the structure (80) comprising the bore (83) for receiving the support (2) of the cartridge (100).

21. A cartridge (100) according to claim 7 characterised in that, in the assembled position, the lower surface (59) of the lower ring (51) of the assembler (5) does not abut the bottom (27) of the groove (24) of the support (2), in such a way that a third annular volume (73) is provided between this lower surface (59) and the bottom (27) of the groove (24), one of the conduits (28) communicating with the outside emerging in this volume (73).

22. A cartridge (100) according to claim 8 characterised in that it comprises a centring device (4) having an axial cavity centred on the cathode (3), a lower surface (46), a lateral outer surface (38, 50), a lateral inner surface (39), an upper surface (48, 49) at least one upper part (42) of the centring device (4) being fitted inside the central cavity (10) of the anode (1), one or more passages (44, 144, 95, 45, 64, 68, 74) bringing into communication the lateral outer or lower surface (50, 46) with the upper surface (48, 49) of the upper part (42) of the centring device (4).

23. A cartridge (100) according to claim 11 characterised in that conduits (44, 144) have an end emerging in a radial groove (148) formed on the lateral outer surface (50) of the centring device (4).

24. A cartridge (100) according to claim 11 characterised in that conduits (44, 144) have an end emerging in a radial inner groove (135) of the inner cavity (10) of the anode (1).

25. A cartridge (100) according to claim 13 characterised in that the anode (1) is fitted with one or more conduits (127) passing axially through a central ring (123) of the anode (1) surrounding the central cavity (10) of the anode (1) and emerging opposite one end of the passages (44, 144) of the centring device (4).

26. A cartridge (100) according to claim 13 characterised in that the support (2) is fitted with one or more conduits (75) passing through the support (2) and communicating with passages (64, 68, 74) of the centring device (4).

27. A cartridge (100) according to claim 13 characterised in that the support (2) is fitted with a central bore (23), this bore (23) housing a lower part of the cathode (3).

28. A plasma torch characterised in that it comprises a structure for connecting and holding in place a cartridge (100) for a plasma torch according to claim 18, this structure having an upper part (82) comprising a bore (83) for receiving the anode (1) of the cartridge (100), a central axial hole (91) the diameter of which is at least equal to or greater than the diameter of the upper part (13) of the central cavity (10) of the anode (1), and a lower part (81) comprising a bore (83) for receiving the support (2) of the cartridge, the structure having means (89, 90, 92, 96, 97) of fixing to the cartridge (100) and carrying inlets (86, 87) for a cooling fluid, plasmagene gas, and means (84) of draining the cooling fluid these means positioning themselves, when the cartridge (100) is assembled in the structure (80), opposite the corresponding conduits (127, 130, 75) of the cartridge (100).

* * * * *